United States Patent [19]

Lee et al.

[11] 4,389,054
[45] Jun. 21, 1983

[54] SHOCK ABSORBENT GAS SEAL

[75] Inventors: Yuen F. Lee, Cupertino; Shiro Aisawa, Sunnyvale, both of Calif.

[73] Assignee: Westinghouse Electric Corp., Pittsburgh, Pa.

[21] Appl. No.: 287,612

[22] Filed: Jul. 28, 1981

[51] Int. Cl.³ .............................................. F16J 15/32
[52] U.S. Cl. .................................. 277/214; 277/215
[58] Field of Search ............ 277/213, 214, 97, 212 FB

[56] References Cited
U.S. PATENT DOCUMENTS 3,995,332 12/1976 Forchini et al. ..................... 277/215
4,033,593 7/1977 Molnar et al. ....................... 277/214
4,118,019 10/1978 Wier .

Primary Examiner—Robert I. Smith
Attorney, Agent, or Firm—F. J. Baehr, Jr.

[57] ABSTRACT

A shock absorbent seal having chevron shaped struts and cap disposed between arcuate shaped inner and outer pads, the struts and caps have grooves where they attach to the pads and a groove at the apex to make them flexible during initial compression and the grooves and thickness of the struts and cap can be varied to meet deflection and load requirements.

7 Claims, 6 Drawing Figures

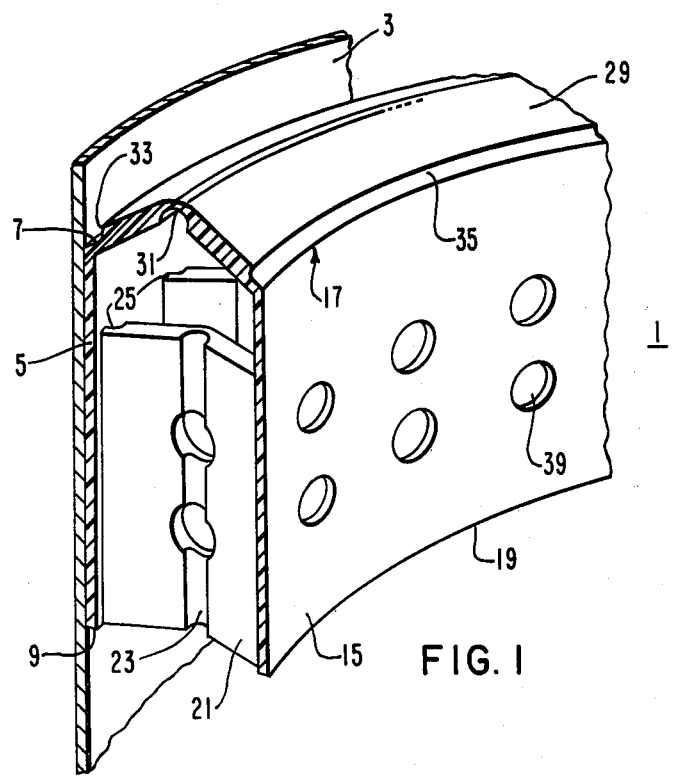
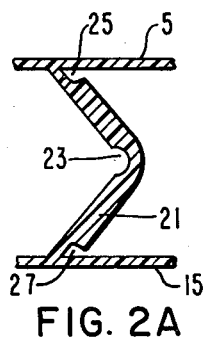
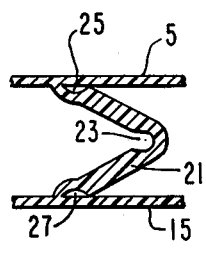
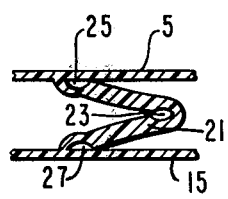
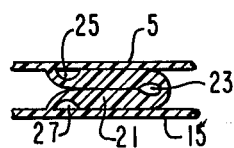
FIG. 1
FIG. 2A
FIG. 2B
FIG. 2C
FIG. 2D

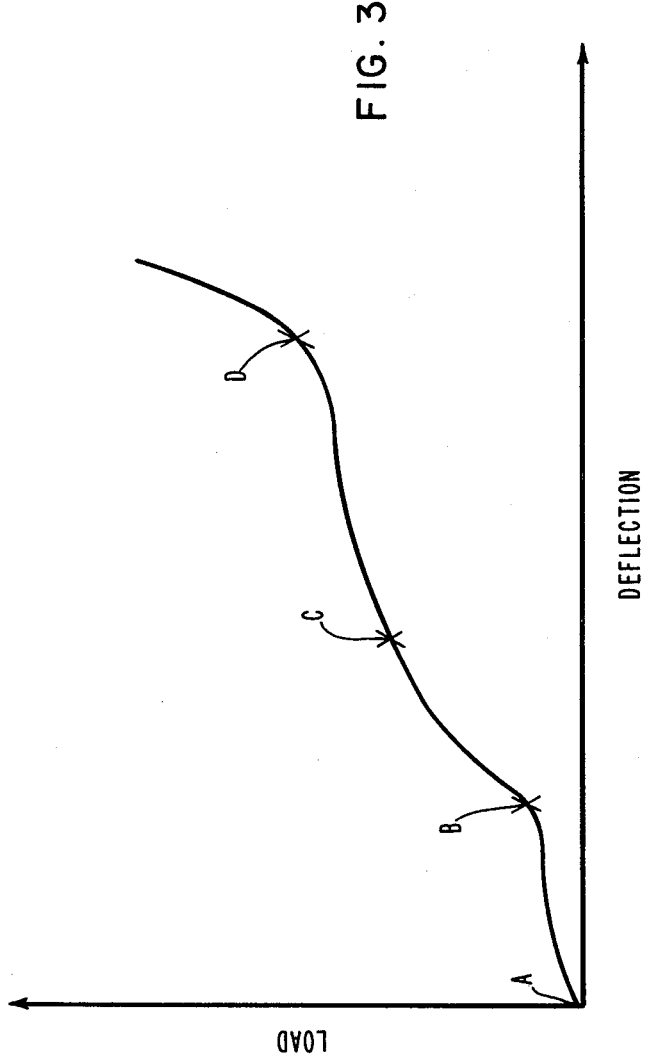

SHOCK ABSORBENT GAS SEAL

GOVERNMENT CONTRACT CLAUSE

The U.S. Government has rights in this invention pursuant to Contract No. N-0003074-C-0132 between Westinghouse Electric Corporation and the Department of Defense.

BACKGROUND OF THE INVENTION

This invention relates to a shock absorbent gas seal and more particularly such a seal utilized in a missile launcher.

In missile launchers, two separate devices are utilized to seal ejection gas and for shock protection. To seal ejection gas a lip seal such as described in U.S. Pat. No. 4,033,593 is utilized and for shock protection a shock pad such as described in U.S. Pat. No. 4,118,019 is utilized. At high eject pressures the lip seal has a tendency to invert and if the missile is offset within the launch tube the lip seals become unstable tending to increase the offset.

SUMMARY OF THE INVENTION

In general a shock absorbing seal, when made in accordance with this invention, comprises an outer arcuate pad having upper and lower arcuate margins, an inner arcuate pad having upper and lower arcuate margins, a plurality of chevron shaped struts disposed in a space relationship between the arcuate pads and extending upwardly from the lower margin thereof, and an arcuate chevron shaped cap integrally connected to the upper margins of the arcuate pads.

BRIEF DESCRIPTION OF THE DRAWINGS

The objects and advantages of this invention will become more apparent from reading the following detailed description in conjunction with the accompanying drawings, in which:

FIG. 1 is a partial perspective view, partially in section, of a shock absorbent seal made in accordance with this invention;

FIGS. 2A, B, C and D are partial sectional views of a portion of the shock absorbent seal under different shock loads; and FIG. 3 is a curve of load versus deflection for the shock absorbent seal.

DESCRIPTION OF THE PREFERRED EMBODIMENT

Referring now to the drawings in detail and in particular to FIG. 1 there is shown a shock absorbent seal 1 for a missile launch tube 3, the shock absorbent seal 1 comprises a first or outer arcuate pad 5 having upper and lower arcuate margins 7 and 9, a second or inner arcuate pad 15 having upper and lower arcuate margins 17 and 19 and a plurality of chevron shaped struts 21 disposed in a spaced relationship between the arcuate pads 5 and 15. The struts 21 extend upwardly from the lower margins 9 and 19 of the arcuate pads 5 and 15.

The struts 21 have grooves 23, 25, and 27 longitudinally disposed respectably at the center or apex and at the edges are margins of the struts 21. A chevron shaped arcuate cap 29 is disposed adjacent the upper margins 7 and 17 of the arcuate pads 5 and 15. The cap 29 has grooves 31, 33 and 35 longitudinally disposed at the center or apex and at the edges or margins of the arcuate cap 29. As shown in FIG. 1 the chevron cap 29 is made integral with the arcuate pads 5 and 15 and is disposed in a spaced relationship with the chevron struts 21.

The inner surface of the inner pad 15 is lined with a polytetrafluoroethylene material to reduce friction as the missile passes thereover. A plurality of ports or openings 39 are disposed in the inner pad 15 for equalizing the eject pressure around the periphery of the missile.

To regulate the pressure differential across the shock absorbent seal 1 the arcuate segments can be spaced apart leaving a gap between adjacent segments or holes can be disposed in the cap 29.

With the two grooves 25 and 27 in the struts 21, the shock absorbent seal is made more flexible during initial compression so that the initial resistance on the missile is low. The size of the groove 23 as well as the thickness of the struts 21 can be tailored so that the seal 1 meets a specified deflection versus load curve having a shape as shown in FIG. 3. The letters A, B, C and D on the curve in FIG. 3 corresponds to the compression of the seal 1 as shown in FIGS. 2A, 2B, 2C and 2D, respectively. The grooves 31, 33, and 35 in the cap 29 are similar to the grooves 23, 25, and 27 in the struts 21 so that the shock absorbent seal has a relatively uniform resistance across the entire surface. The shock absorbent seal hereinbefore described advantageously does not invert and lose its sealing ability, generates a force on the inside wall of the inner pad causing it to bear against the missile thus having a self centering effect on an offset missile, and has a polytetrafluoroethylene lining on the surface in contact with the missile to reduce friction therebetween.

What is claimed is:

1. A shock absorbent seal comprising an outer arcuate pad having upper and lower arcuate margins, an inner arcuate pad having upper and lower arcuate margins, a plurality of chevron shaped struts disposed in a spaced relationship between said arcuate pads and extending upwardly from the lower margins thereof, and an arcuate chevron shaped cap integrally connected to the upper margins of the arcuate pads and disposed in a spaced relationship with respect to the chevron shaped struts.

2. A shock absorbent seal as set forth in claim 1, wherein the chevron shaped struts have a groove adjacent the pads to increase the flexibility during initial compression.

3. A shock absorbent seal as set forth in claim 2, wherein the chevron shaped struts have a groove adjacent a central apex portion thereof to increase flexibility during initial compression.

4. A shock absorbent seal as set forth in claim 3, wherein the inner surface of the inner arcuate pad is lined with a polytetrafluoroethylene to reduce friction during launch.

5. A shock absorbent seal as set forth in claim 1, wherein the inner surface of the inner arcuate pad is lined with a polytetrafluoroethylene in order to reduce friction during launch.

6. A shock absorbent seal as set forth in claim 4, wherein the chevron shaped cap has a plurality of holes disposed therein to control differential pressure across the seal.

7. A shock absorbent seal as set forth in claim 1, wherein the inner arcuate pad has holes disposed therein to equalize the eject pressure around the periphery of the seal.

* * * * *